United States Patent
McGilliard et al.

(10) Patent No.: US 9,146,720 B1
(45) Date of Patent: Sep. 29, 2015

(54) BINARY FILE APPLICATION PROCESSING

(75) Inventors: Christopher L. McGilliard, Seattle, WA (US); Calvin Y. Kuo, Irvine, CA (US); Patrick R. Schultz, Mission Viejo, CA (US); Therapon Skoteinotis, Seattle, WA (US); Jean-Philippe Langlois, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 13/616,983

(22) Filed: Sep. 14, 2012

(51) Int. Cl.
  *G06F 9/44* (2006.01)
  *G06F 9/445* (2006.01)
(52) U.S. Cl.
  CPC .......................................... *G06F 8/60* (2013.01)
(58) Field of Classification Search
  CPC ....... H04L 67/34; H04L 41/0803; G06F 8/60; H04W 4/003
  USPC ................................................. 717/170, 174
  See application file for complete search history.

(56) References Cited

U.S. PATENT DOCUMENTS

| 8,516,308 | B1 * | 8/2013 | Gill et al. ...................... 714/38.1 |
| 8,650,023 | B2 * | 2/2014 | Brun ................................. 704/9 |
| 8,707,289 | B2 * | 4/2014 | Firman et al. ................. 717/170 |
| 2015/0052098 | A1 * | 2/2015 | Kveton et al. ................... 706/52 |

OTHER PUBLICATIONS

"Amazon® User Review regarding App Compatibility," 2011, URL: http://www.amazon.com/iHome-iP21GVC-App-Friendly-Speaker-Compatible/product-reviews/B004I8WH7O.*
"Amazon® User Review regarding App Compatibility," Jun. 11, 2011, URL: http://www.amazon.com/iHome-iP21GVC-App-Friendly-Speaker-Compatible/product-reviews/B004I8WH7O.*
"Microsoft® XP Emulation Compatibility Wizard," 2001, URL: http://www.dell.com/support/troubleshooting/uk/en/ukbsdt1/KCS/KcsArticles/ArticlelframeView?docid=DSN_6FD8E965060E48F7AA164FA6FFFF243D&doclang=EN#Issue5.*

* cited by examiner

*Primary Examiner* — Kevin Bates
*Assistant Examiner* — Chen-Liang Huang
(74) *Attorney, Agent, or Firm* — Thomas | Horstemeyer, LLP

(57) ABSTRACT

Disclosed are various embodiments for processing applications to determine compatible devices. An application processing system may determine application dependencies by parsing application manifest files, filtering customer reviews, and/or emulating the application on a virtual device. Based at least in part on the application dependencies, a determination may be made whether to make the application available for download and/or execution on a device.

20 Claims, 8 Drawing Sheets

```
<manifest>

<uses-permissions>
        <device_hardware="camera"/>
        <device_hardware="gps"/>
        <device_hardware="phone_antenna"/>     ← 403
        <device_software="internet"/>
        <device_software="contacts_list"/>
    </uses-permissions>

<supports-screens>
        <screen_density="high"/>               ← 406
        <screen_density="medium"/>
    </supports-screens>

<uses-library>
        <library="openGL_graphics_library"/>   ← 409
    <uses-library/>

<application>

...

</application>                             259

</manifest>
```

FIG. 4

BINARY FILE APPLICATION PROCESSING

BACKGROUND

With the emergence of mobile technology, an abundance of various devices are entering the marketplace. In order to offer software for download on these various devices, developers of software applications are able to upload proprietary applications to electronic marketplaces. Traditionally, these electronic marketplaces only permit the upload of a single version of the application. Thus, one version of an application must account for all the various environments created by the abundance of devices with differing hardware and software capabilities.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a drawing of an example of a manifest file of FIG. 2 according to various embodiments of the present disclosure.

DETAILED DESCRIPTION

The present disclosure relates to processing applications to determine compatible devices capable of performing all or most of the functions of the application. When a single version of an application is uploaded and made active in an electronic marketplace, this version must account for all types of devices in a single binary file. The one version must account for all types of devices in a single binary file. This results in large file sizes creating longer downloads and bulky and often inefficient software. An application processing system, permitting multiple binary file uploads, may determine hardware and software dependencies required by an application by parsing manifest files corresponding to the application, filtering customer reviews, and/or emulating the application on a virtual device. Based at least in part on the application dependencies, a determination may be made whether the application should be available for download and/or execution on a device.

In the following discussion, a general description of the system and its components is provided, followed by a discussion of the operation of the same.

Figure 1A:
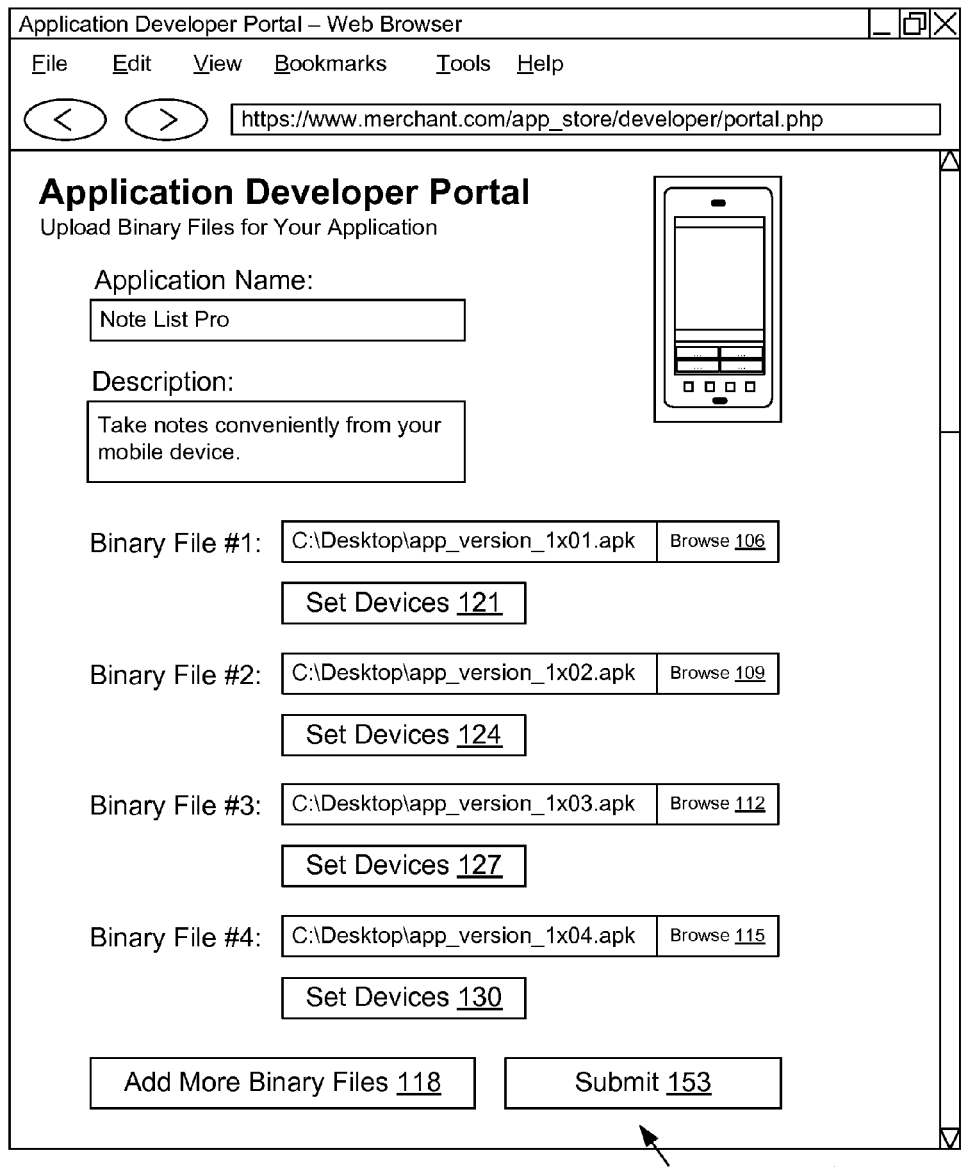
FIGS. 1A-B are drawings of examples of user interfaces rendered by a client in the networked environment of FIG. 2 according to various embodiments of the present disclosure.
Figure 1B:
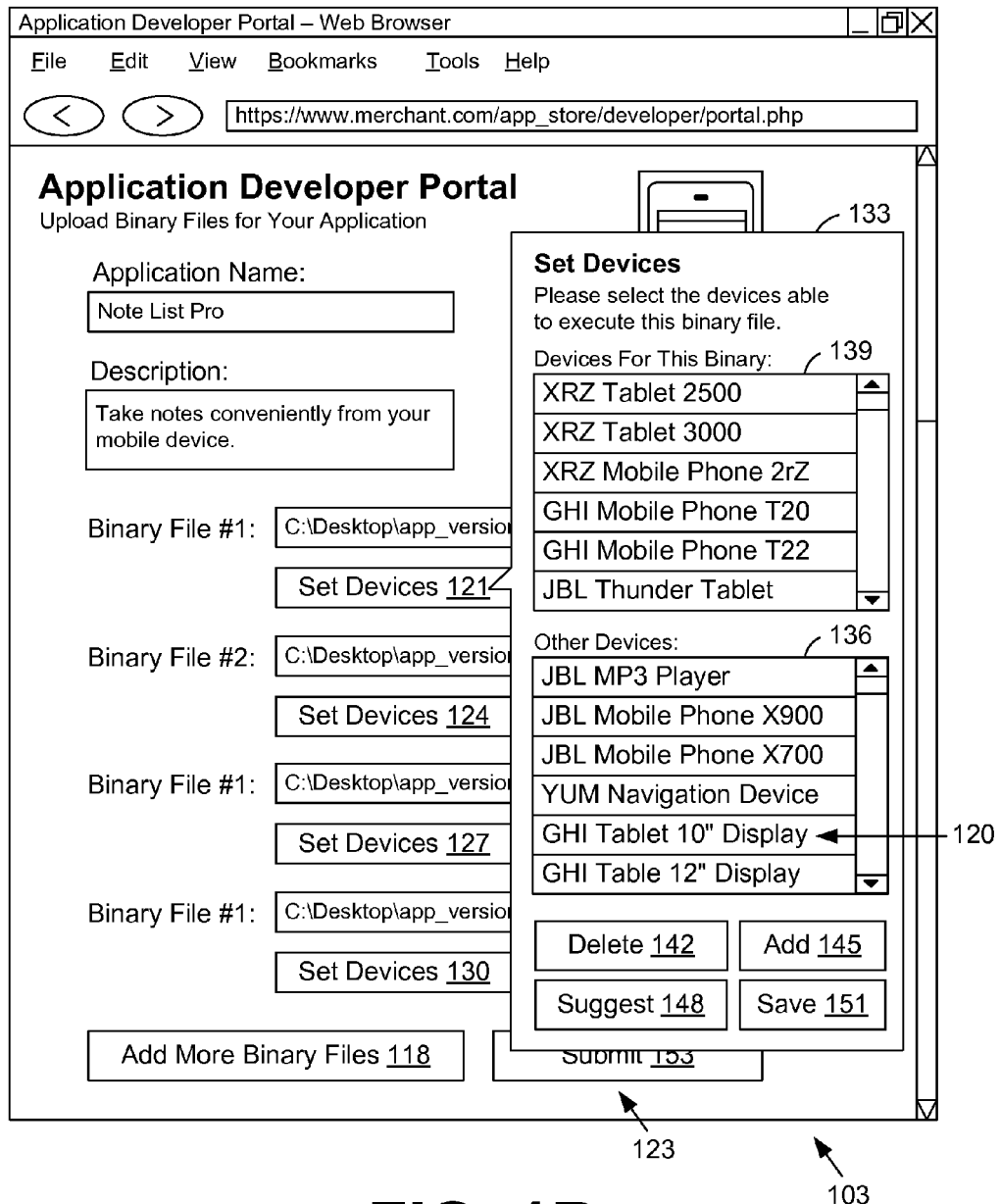

With reference to FIGS. 1A-B, shown are examples of user interfaces 103 rendered in a browser on a client. The application processing system 123 may generate a series of user interfaces 103 thereby permitting a developer of an application to upload multiple binaries of the application to, for example, an electronic marketplace. By engaging browse button 106, 109, 112, and/or 115, it is understood that a dialog box (not shown) may appear permitting a user to select one or more binary files to upload. By engaging button 118, a user may add more fields thereby permitting uploads of additional binary files. Buttons 121, 124, 127, and 130 may initiate the selection of devices specific to a binary file via dialog 133.

By selecting specific devices, it is understood that the developer may make specific binary files available and/or accessible to the devices indicated by the developer. A developer may test an application on an emulator or on a physical device as may be appreciated. Accordingly, the developer may desire to specify the compatibility of the application with a particular device. For example, by engaging button 121, a dialog 133 may permit the developer to select one or more devices from a pre-populated list 136 of devices, wherein selecting a device for the pre-populated list 136 of devices makes the binary file available to that device. Access may include authorization by the application processing system 123 and/or an electronic commerce application 220 to view, download, and/or execute the application on a particular device. By selecting a device 120 from the pre-populated list 136 of devices 120, the device may be moved to the list 139 of authorized devices. Button 142 facilitates the deletion of a selected device from either list. Similarly, button 145 permits the addition of a device to either list. Button 148 may initiate parsing of the binary file to determine suggested devices 120 by determining the application dependencies as will be discussed in detail below. Button 151 may permit the storage of the list in, for example, a data store. Similarly, button 153 may initiate the upload of the one or more binary files while storing all relevant information in, for example, the data store.

Next a discussion of the computing environment is provided in which the user interface 103 of FIG. 1 is generated followed by a discussion of the operation of the same.

Figure 2:
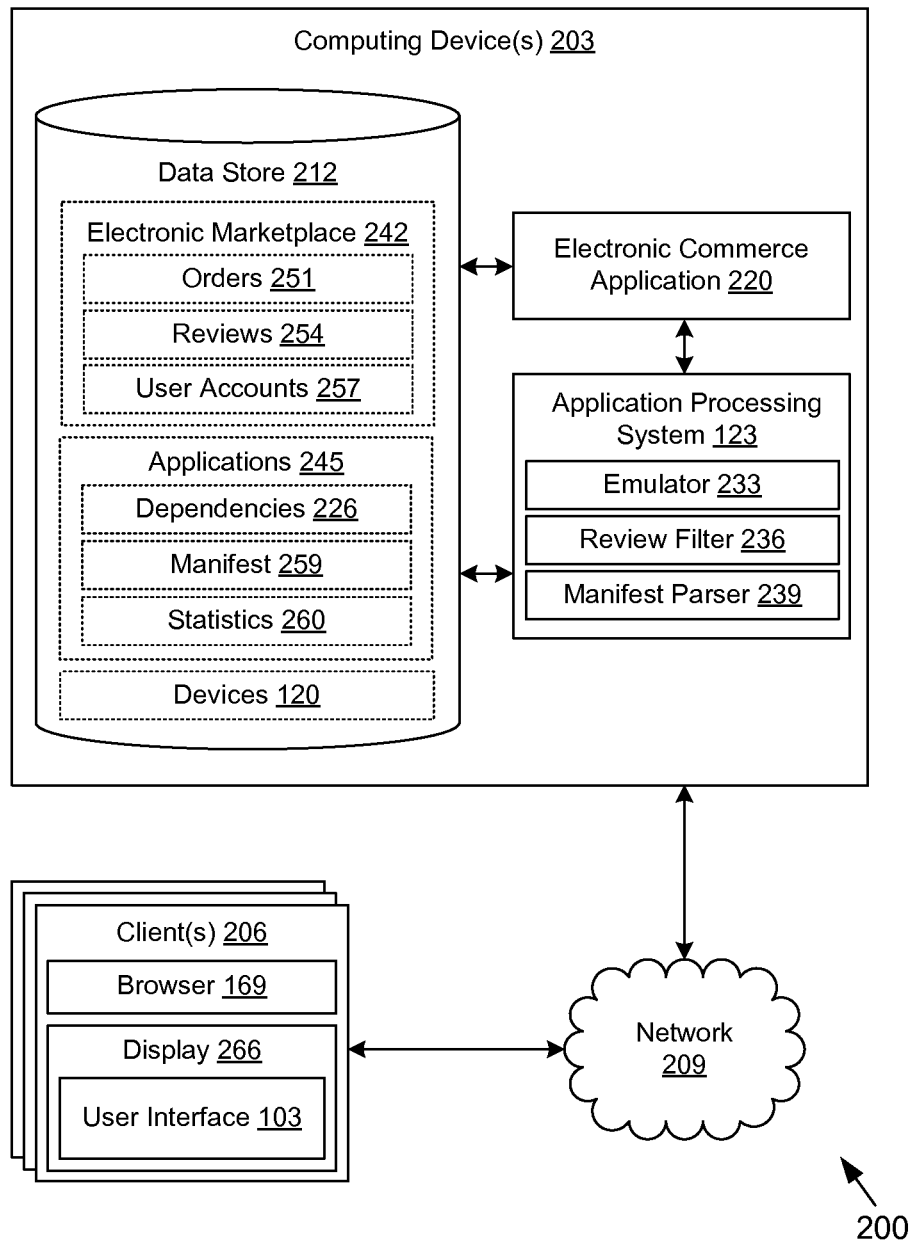
FIG. 2 is a drawing of a networked environment according to various embodiments of the present disclosure.

With reference to FIG. 2, shown is a networked environment 200 according to various embodiments. The networked environment 200 includes a computing device 203 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing device 203 may comprise, for example, a server computer or any other system providing computing capability. Alternatively, the computing device 203 may employ a plurality of computing devices that may be employed that are arranged, for example, in one or more server banks or computer banks or other arrangements. Such computing devices may be located in a single installation or may be distributed among many different geographical locations. For example, the computing device 203 may include a plurality of computing devices that together may comprise a cloud computing resource, a grid computing resource, and/or any other distributed computing arrangement. In some cases, the computing device 203 may correspond to an elastic computing resource where the allotted capacity of processing, network, storage, or other computing-related resources may vary over time.

Various applications and/or other functionality may be executed in the computing device 203 according to various embodiments. Also, various data is stored in a data store 212 that is accessible to the computing device 203. The data store 212 may be representative of a plurality of data stores 212 as can be appreciated. The data stored in the data store 212 for example, is associated with the operation of the various applications and/or functional entities described below.

The components executed on the computing device 203, for example, include an electronic commerce application 220, an application processing system 123, and other applications, services, processes, systems, engines, or functionality not discussed in detail herein.

The electronic commerce application 220 is executed in order to facilitate the online purchase of items over the network 209. The electronic commerce system 220 also performs various backend functions associated with the online presence of a merchant in order to facilitate the online purchase of items as will be described. For example, the electronic commerce system 220 generates network pages such as web pages or other types of network content that are provided to clients 206 for the purposes of selecting items, software, and/or applications for purchase, rental, download, lease, or other form of consumption as will be described.

The application processing system 123 is executed to process binary files associated with one or more versions of an application to determine one or more application dependencies 226 of the application. For example, application dependencies 226 may relate to a device's hardware and/or software capabilities necessary for an application to run effectively on the device. Additionally, the application processing system 123 determines a score indicating the degree of compatibility the application on a particular device. If the score meets a threshold, the application processing system 123 may make the application available for download and/or execution on the particular device. Additionally, the score indicating whether the application is compatible on a particular device may be used in determining whether the application is compatible on devices similar to the particular device. For example, if it is determined that an application has a high degree of compatibly with a first device, it may be determined that the application is also compatible with a second device comprising similar software and hardware capabilities. If necessary, the application processing system 123 may determine whether a user's device 120 associated with a user account 257 comprises consistent and similar software and hardware capabilities as another device 120 previously associated with a score.

The application processing system 123 may interact with the electronic commerce application 220 to enable or disable viewing pages for the application on the particular device or on any device associated with a user account 257. To determine a score indicating the compatibility of an application on a device, the application processing system 123 may employ, for example, an emulator 233, a review filter 236, and/or a manifest parser 239, described in greater detail below.

The data stored in the data store 212 includes, for example, data associated with an electronic marketplace 242, application data 245, device data 120, and potentially other data. Orders 251 may be associated with the download and/or purchase of an application from electronic commerce application 220. Reviews 254 may be associated with a customer review submitted by a customer after the download and/or purchase of an application. User accounts 257 may be associated with a customer of the electronic commerce application 220 and may be used to store information such as name, address, billing information, device information, e-mail address, authentication credentials, and/or any other information associated with the customer.

One or more applications, as well as information associated with the one or more applications, may be stored in the data store 212 as application data 245. For example, a developer may upload binary files embodying multiple versions of an application as shown in FIGS. 1A-B. When the application processing system 123 determines the application dependencies of an application, the dependencies may be stored with respect to the application as application dependency data 226. Files containing information about the application dependencies 226, generally referred to as manifest files, may be saved as an application manifest 259. Additionally, statistics 260 indicating the number of downloads of an application, identified errors, and/or any other statistical information associated with the application may be stored in data store 212. Device data 120 may contain information associated with a multitude of devices such as the device's hardware capabilities, software capabilities, software libraries, operating systems, carrier information, and/or any other device information.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application and/or other applications. The client application may be executed in a client 206, for example, to access network content served up by the computing device 203 and/or other servers, thereby rendering a user interface 103 (FIG. 1) on the display 266. The client application may, for example, correspond to a browser 269, a mobile application, etc., and the user interface 103 may correspond to a network page, a mobile application screen, etc. The client 206 may be configured to execute applications beyond the client application such as, for example, browsers, mobile applications, email applications, social networking applications, and/or other applications.

Next, a general description of the operation of the various components of the networked environment 200 is provided. To begin, one or more binary files are received by the application processing system 123. Each binary file may correspond to a different version of an application. Each version may be tailored to a particular type of operating system, screen, library, and/or device. For example, an application may have three binary files, each binary file corresponding to a different version of the same application, wherein each version is tailored to a high density, medium density, and low density screen as may be appreciated. Similarly, a version of the application may be created for tablets while a different version may be developed for mobile devices.

The application processing system 123 may take each binary file received and apply one or more operations to determine a set of application dependencies 226. The application dependencies 226 may be used in determining which devices may properly support the functionality of a version of an application. For example, if an application dependency 226 provides that the application requires the use of a camera, the application processing system 123 may determine which devices have a camera hardware component. A score may be determined by the application processing system 123 to indicate whether a device 120 is capable of implementing the functionality of the application. If the score meets a threshold, the application may be made available to the device 120. For example, a user visiting the electronic commerce application 220 on a device 120 may be given or denied access to view a web page associated with the application and/or download the application based at least in part on whether the score meets the threshold.

In various embodiments, the determination of a score may not be required before making a version of an application available to a device 120. For example, if all application dependencies 226 associated with a version of an application are met by a device's capabilities, the version of the application may be made available to the device 120 without the determination of a score. Similarly, if none of the application dependencies 226 associated with a version of an application are met by the capabilities of a device 120, the application may not be made available to device.

In determining application dependencies 226, the application processing system 123 may employ at least an emulator 233, a review filter 236, and a manifest parser 239. The emulator 233 may be configured to emulate a particular device and may run the application 245 as a background process. The emulator 233 may progress through the application as may be understood to determine any incompatibilities and/or bugs in the software. The review filter 236 may be used to filter customer reviews associated with the application 245 to determine whether the application 245 is compatible with a device. Finally, the application processing system 123 may identify an application manifest file 259 to parse in order to determine the application dependencies 226. Accordingly, the score may be determined and/or modified to reflect the compatibility of the application on a particular device 120. Based at least in part on whether a score meets a threshold, the application may be made available to a client 206 through electronic commerce application 220.

Figure 3:
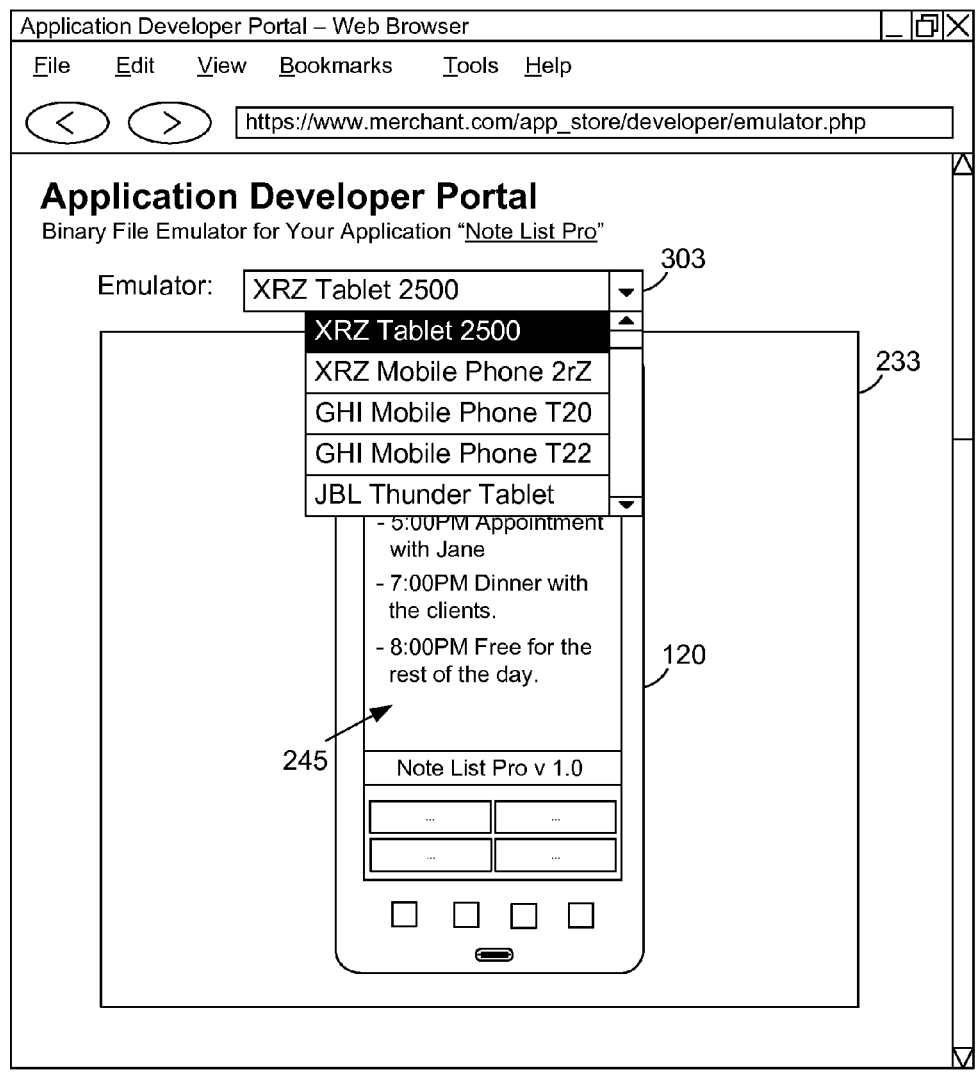
FIG. 3 is a drawing of an example of a user interface rendered by a client in the networked environment of FIG. 2 according to various embodiments of the present disclosure.

Referring next to FIG. 3, shown is an example of a user interface 103 rendered by the application processing system 123 in a browser 269 (FIG. 2) on a client 206 (FIG. 2). In this non-limiting example, the application processing system 123 may generate a user interface 103 comprising an emulator thereby permitting a developer of an application to test versions of an application on a virtual device. For example, emulator 233 renders a view of a mobile-type device 120 running an application 245 (FIG. 2). A combination box 303 may permit the developer to change the type of device 120 the emulator 233 is emulating. Although this example permits a developer to physically inspect the emulator 233, it is understood that the emulator 233 may run as a background process. As a background process, the emulator 233 may proceed through the functionality of the application to verify that the application is compatible with a device 120 being emulated in the emulator 233.

As an alternative to the emulator, it is understood that a developer may test one or more versions of an application on one or more physical devices. Accordingly, the user interface of FIGS. 1A-B permit a developer to specify application dependencies 226 and/or one or more devices 120 for each binary file corresponding to a different version of an application in order to make the application available for download and/or execution on the specified device, as previously mentioned with respect to FIGS. 1A-B.

Turning now to FIG. 4, shown is an example of a manifest file 259 that may be embodied in a binary file. For example, code block 403 contains permissions needed by an application 245 to fully implement the functionality of the application 245 (FIG. 2). As can be seen in code block 403, the application utilizes a device's camera, global positioning system (GPS), phone antenna, internet capabilities, and/or contacts list. Alternatively, an application 245 may only be supported on certain screen resolutions. In code block 406, this application 245 may only be supported on high or medium screen density devices. Similarly, code block 409 relates to libraries necessary to implement the application's functionality. For example, the OpenGL graphics library may be necessary on a device 120 in order to successfully execute the application 245. It is understood that the application processing system 123 (FIG. 1) and/or the manifest parser 239 (FIG. 2) may parse the manifest file 259 to determine multiple application dependencies and/or requirements.

Figure 5:
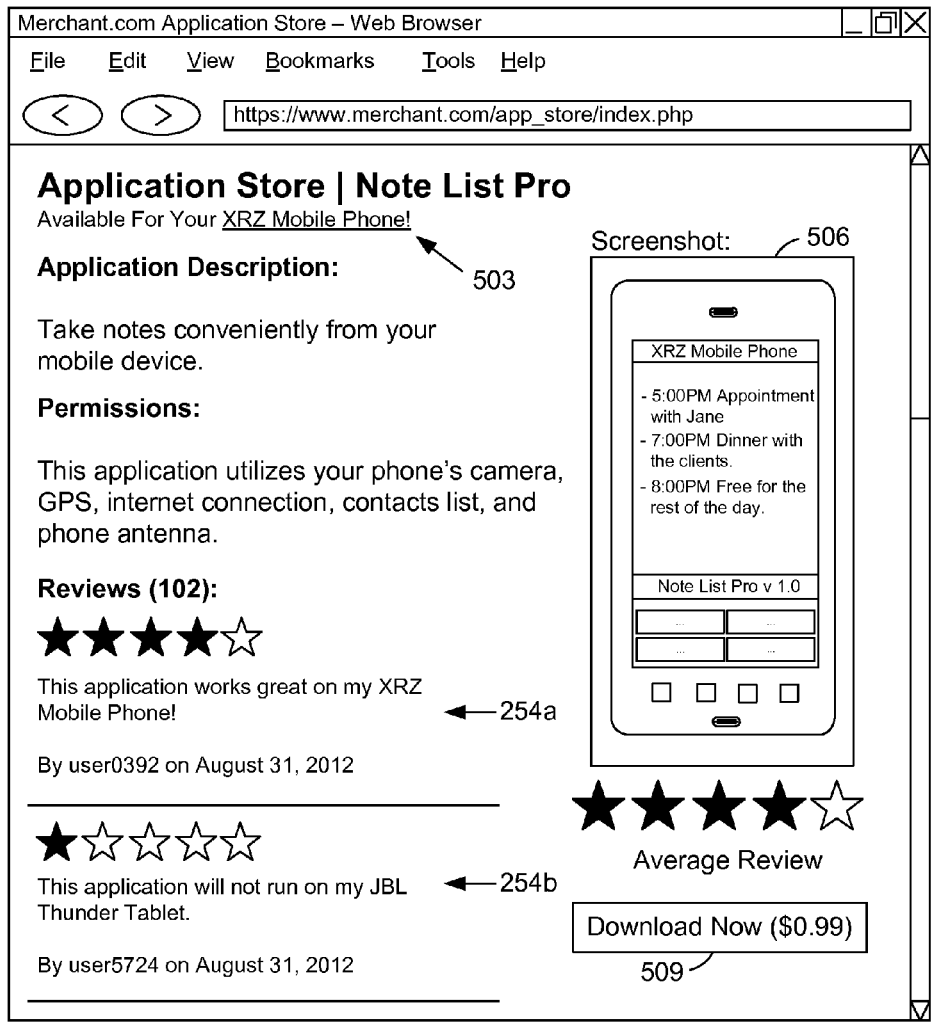
FIG. 5 is a drawing of an example of a user interface rendered by a client in the networked environment of FIG. 2 according to various embodiments of the present disclosure.

Moving on to FIG. 5, shown is an example of a user interface 103 rendered in a browser 269 on a client 206 (FIG. 2). In this non-limiting example, an application 245 (FIG. 2) is available for purchase and download in an electronic commerce application 220 (FIG. 2). If a user's device is associated with a user account 257 (FIG. 2), the electronic commerce application 220 and/or application processing system 123 (FIG. 1) may determine whether the application 245 is compatible with the user's device 120. For example, label 503 indicates that the application 245 is available on a device 120 associated with the user's account 257. The availability of the application on the user's mobile device may be determined based at least in part on whether a score indicating a compatibility of the application with the user's mobile device meets a threshold. It is understood that if the application processing system 123 determined the application 245 to not be compatible on the user's device, the application 245 may be disabled for download, view, and/or purchase in the electronic commerce application 220.

Additionally, emulator 233 may be leveraged to dynamically generate a screenshot 506 of the application running on the user's device 120. Alternatively, the screenshot 506 may be static. Reviews of the application, commonly shown in electronic commerce applications 220, may be filtered and analyzed in determining a compatibility of the application on a particular device 120. For example, review 254a provides a positive review of the application on an "XRZ Mobile Phone." Accordingly, a score indicating a compatibility of the application with the device may be generated and/or modified based at least on the positive review. Alternatively, review 254b states a negative review of the application on a "JBL Thunder Tablet." It is understood that a score indicating a compatibility of the application on the "JBL Thunder Tablet" may be negatively modified. Button 509 may initiate the purchase and/or download of the application on the user's device 120 as can be appreciated.

Figure 6:
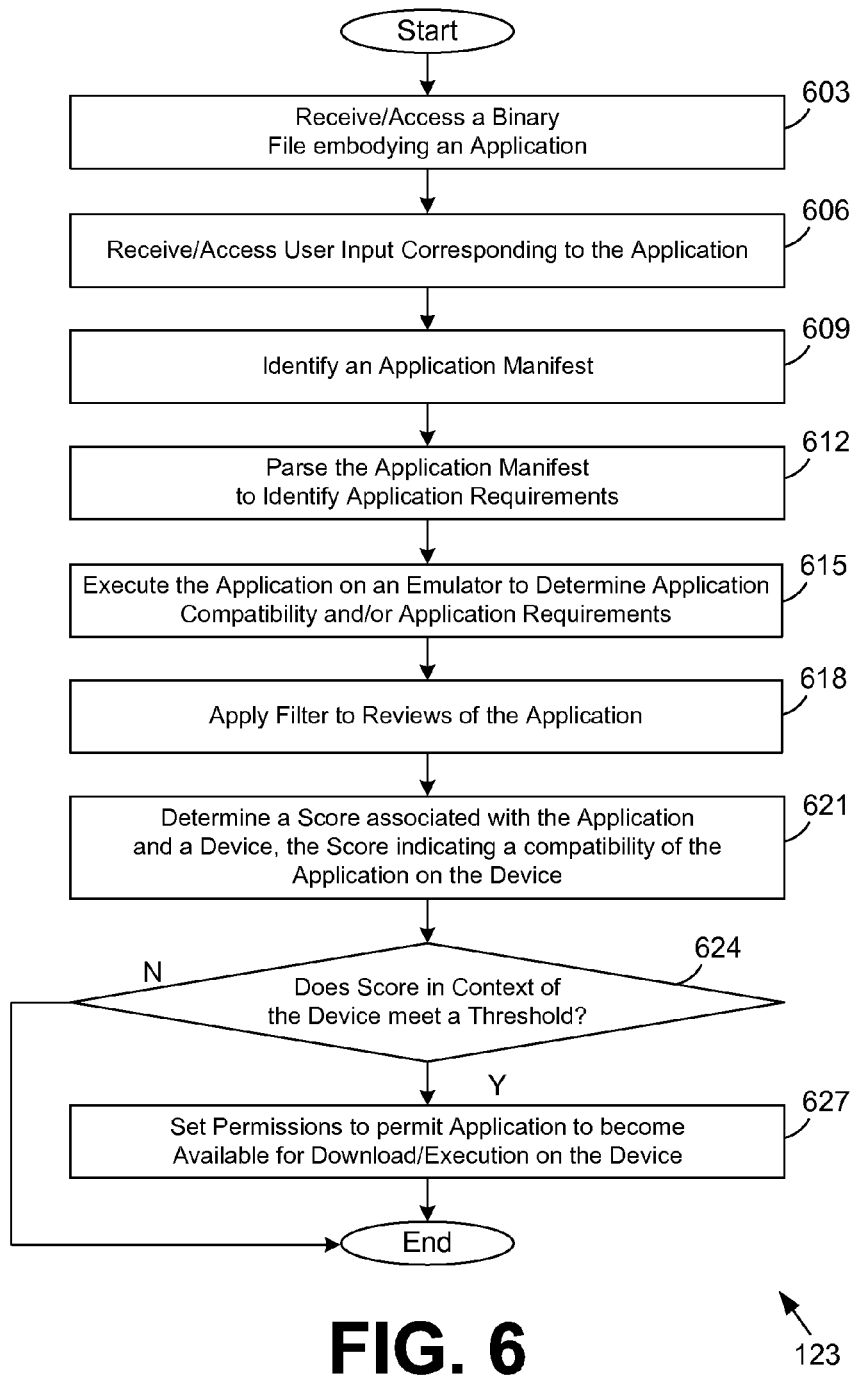
FIG. 6 is a flowchart illustrating one example of functionality implemented as portions of the application processing system executed in a computing environment in the networked environment of FIG. 2 according to various embodiments of the present disclosure.

Referring next to FIG. 6, shown is a flowchart that provides one example of the operation of a portion of the application processing system 123 (FIG. 1) according to various embodiments. It is understood that the flowchart of FIG. 6 provides merely an example of the many different types of functional arrangements that may be employed to implement the operation of the portion of the application processing system 123 as described herein. As an alternative, the flowchart of FIG. 6 may be viewed as depicting an example of steps of a method implemented in the computing device 203 (FIG. 2) according to one or more embodiments.

Beginning with box 603, a binary file embodying an application 245 (FIG. 2) is uploaded and received by the application processing system 123. For example, a developer may upload one or more binary files embodying one or more versions of application 245 to the application processing system 123 as shown in FIGS. 1A-B. Next, in box 606, user input corresponding to the application is received. For example, the input defined by a user in FIGS. 1A-B may be received by the application processing system 123. The user input may include a list of compatible devices 120 (FIG. 2), application dependencies 226 (FIG. 2), and/or any other information associated with the application 245.

In box 609, an application manifest 259 (FIG. 2) may be identified. For example, a binary file embodying an application 245 uploaded by the developer may be a package file embodying multiple files packaged into one file. The package file may be parsed to identify the application manifest 259. In box 612, the application manifest file 259 may be parsed to determine application dependencies 226. As shown in the application manifest file 259 of FIG. 4, the application manifest file 259 may comprise information associated with required hardware, software, and/or libraries, necessary to successfully perform all the functionalities of the application 245. For example, the application manifest file 259 may convey that a camera is required to perform functions in the application 245.

Moving on to box 615, the application 245 may be executed on an emulator 233 to determine a compatibility of the application 245 with respect to a particular device 120. This may require configuring the emulator 233 to mimic a physical device 120 by emulating the physical device 120 in a virtual environment. For example, to determine whether the application 245 is capable of running on a device 120, the emulator 233 may try to access all screens, settings, and/or any other features of the application 245 to determine whether the application 245 performs as predicted and without error. Additionally, by emulating the application 245, the application processing system 123 may determine and/or log any errors associated with the virtualization of the application 245 on the emulator 233. This information may be conveyed to the developer and/or used in determination of the score as will be discussed below.

Referring next to box 618, reviews of the application 245 may be filtered to determine any compatibilities and/or incompatibilities, if applicable. It is understood that if a developer is uploading a version of an application 245 for the first time, the application 245 has not yet been made available for download or review 254 (FIG. 2). Alternatively, if the application 245 has been available for download for a period of time, the reviews 254 may be utilized in determining whether an application 245 is compatible on a device 120. For example, review 254a (FIG. 5) provides a positive review of an application on a particular device. Accordingly, this review may be used in determination of a score indicating a compatibility of the application with the device as will be discussed below.

In box 621, a score indicating a compatibility of the application on the device 120, is determined. The score may be based at least in part on the parsing of the application manifest file 259, the user input associated with the application 245, the filtered reviews 254, and/or the emulation of the application on a device. It is understood that some sources of the determined score may be afforded more weight than others. For example, the potential of user error in the user input likely will be high. Therefore, parsing of the application manifest file 259 may be afforded more weight in the determination of the score than the user input. Similarly, the potential of user error in customer reviews 254 may also be high. Accordingly, the emulation of the application on a device may be afforded more weight than customer reviews 254.

Additionally, the score may be based on the desired functionality of the application 245. For example, if a photo-sharing application has an application dependency 226 requiring the use of a device's camera, a low score may be given when the device does not have a camera. It may be determined, however, that a camera is a minor feature of the application. For example, a social networking application may have the capability of taking pictures to share through a social network. However, this feature may be incidental to the overall function of the application. Accordingly, the score may reflect whether an application dependency 226 is critical.

In box 624, it is determined whether the score determined in box 621 meets a predefined threshold. The predefined threshold may be specified so as to facilitate determining whether the application 245 will be available for download and/or execution on a particular device 120. For example, a predefined threshold may require a device 120 to be compatible with at least 90% of application dependencies 226 associated with an application 245. A score indicating that a device meets 95% of the application dependencies 226 may meet the predefined threshold. If so, in box 627, permissions associated with the application 245 and a device 120 may be set accordingly to permit download and/or execution of the application on the device. Alternatively, if the score does not meet the threshold, the application 245 may not be permitted to be downloaded and/or executed on the device 120. Similarly, a page displaying the application in the electronic commerce application 220 may be disabled and/or removed for the particular device.

Figure 7:
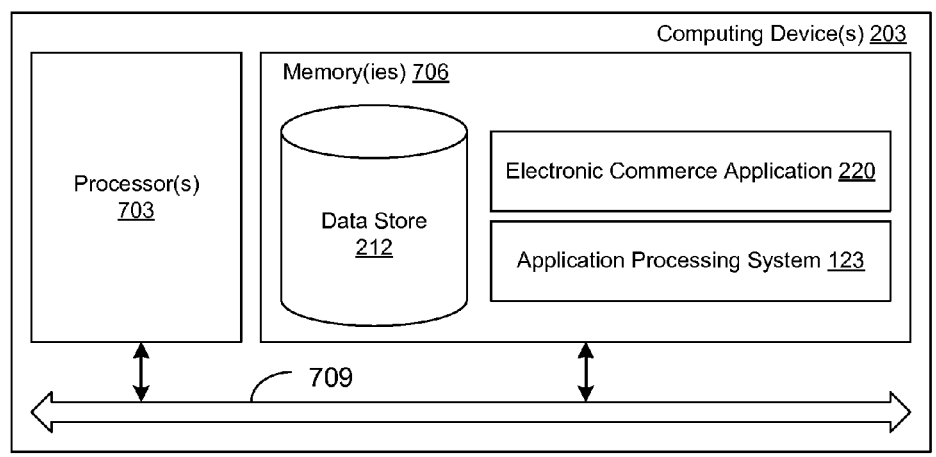
FIG. 7 is a schematic block diagram that provides one example illustration of a computing environment employed in the networked environment of FIG. 2 according to various embodiments of the present disclosure.

With reference to FIG. 7, shown is a schematic block diagram of the computing device 203 according to an embodiment of the present disclosure. The computing device 203 includes one or more computing devices 203. Each computing device 203 includes at least one processor circuit, for example, having a processor 703 and a memory 706, both of which are coupled to a local interface 709. To this end, each computing device 203 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce application 220, the application processing system 123, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce application 220, the application processing system 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the application processing system 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 220 and the application processing system 123, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:

code that accesses a plurality of binary files, wherein individual ones of the binary files correspond to a version of an application;

code that identifies and parses a manifest file associated with the individual ones of the binary files to identify a plurality of application dependencies corresponding to a respective one of the binary files;

code that identifies a user device associated with a user account;

code that determines a score indicating a compatibility of the individual ones of the binary files with the user device, wherein the score is determined based at least in part on:

the application dependencies identified from the parsing of the manifest file associated with the individual ones of the binary files;

user input associated with the individual ones of the binary files, the user input being identified from at least one review provided in association with the version of the application; and an execution of the individual ones of the binary files on an emulator emulating the user device;

code that selects at least one of the binary files in response to the score associated with the at least one of the binary files meeting a predefined threshold;

code that makes the selected at least one of the binary files available for download on the user device; and code that makes the selected at least one of the binary files available for execution on the user device.

2. The non-transitory computer-readable medium of claim 1, wherein the application dependencies further comprise a plurality of screen resolutions.

3. The non-transitory computer-readable medium of claim 1, wherein the application dependencies further comprise a plurality of hardware requirements.

4. A system, comprising:
at least one server computing device; and
an application executable in the at least one server computing device, the application comprising:

logic that accesses a plurality of binary files, wherein individual ones of the binary files correspond to at least one of a plurality of versions of a client application;

logic that parses a manifest file associated with the individual ones of the binary files to identify a plurality of application dependencies for the individual ones of the binary files;

logic that determines a score indicating a compatibility of individual ones of the versions of the client application with at least one of a plurality of devices based at least in part on the application dependencies parsed from the manifest file; and logic that makes at least one of the binary files accessible to a respective one of the devices based at least in part on the score associated with the at least one of the binary files meeting a threshold indicating the compatibility of a corresponding one of the versions of the client application with the respective one of the devices.

5. The system of claim 4, wherein the application further comprises logic that makes the at least one of the binary files available for download on the respective one of the devices.

6. The system of claim 4, wherein the application further comprises logic that makes the at least one of the binary files available for execution on the respective one of the devices.

7. The system of claim 4, wherein the application further comprises:

logic that receives user input associated with the at least one of the binary files, wherein the user input further identifies the application dependencies associated with the at least one of the binary files; and logic that modifies the score based at least in part on the application dependencies identified in the user input.

8. The system of claim 4, wherein the application further comprises:

logic that receives user input associated with the at least one of the binary files, wherein the user input indicates a plurality of compatible devices; and logic that modifies the score based at least in part on the compatible devices identified in the user input.

9. The system of claim 4, wherein the application further comprises:

logic that configures an emulator to emulate the respective one of the devices;

logic that performs an execution of the corresponding one of the versions of the client application on the emulator; and logic that modifies the score based at least in part on a verification of the application dependencies in the execution.

10. The system of claim 4, wherein the application further comprises:

logic that receives a plurality of reviews in association with the corresponding one of the versions of the client application;

logic that filters the reviews to determine a compatibility of the corresponding one of the versions of the client application with the respective one of the devices; and logic that modifies the score based at least in part on a verification of the application dependencies determined from the reviews.

11. The system of claim 4, wherein the application dependencies comprise at least one screen resolution.

12. The system of claim 4, wherein the application dependencies comprise at least one hardware requirement.

13. The system of claim 4, wherein the application dependencies comprise at least one software library.

14. A method, comprising:
receiving, by at least one computing device, a binary file corresponding to a version of an application;

parsing, by the at least one computing device, a manifest file associated with the binary file to identify a plurality of application dependencies;

determining, by the at least one computing device, a score indicating a degree of compatibility of the version of the application with a device, the score indicating whether the device meets the application dependencies parsed from the manifest file; and modifying, by the at least one computing device, a permission associated with the binary file and the device based at least upon whether the score meets a predefined threshold.

15. The method of claim 14, wherein the permission makes the version of the application available for execution on the device.

16. The method of claim 14, further comprising:
receiving, by the at least one computing device, user input associated with the binary file, wherein the user input further identifies the application dependencies; and modifying, by the at least one computing device, the score based at least in part on the application dependencies identified in the user input.

17. The method of claim 14, further comprising:
- configuring, by the at least one computing device, an emulator to emulate the device;
- performing, by the at least one computing device, an execution of the version of the application on the emulator; and
- modifying, by the at least one computing device, the score based at least in part on a verification of the application dependencies in the execution of the version of the application.

18. The method of claim 14, further comprising:
- receiving, by the at least one computing device, a plurality of reviews in association with the version of the application;
- filtering, by the at least one computing device, the reviews to determine a compatibility of the version of the application with the device; and
- modifying, by the at least one computing device, the score based at least in part on a verification of the application dependencies determined from the reviews.

19. The method of claim 14, further comprising receiving, by the at least one computing device, an upload of a plurality of versions of the application.

20. The method of claim 14, wherein the application dependencies comprise at least one hardware requirement.

\* \* \* \* \*